(12) United States Patent
Mezzalira et al.

(10) Patent No.: US 11,353,143 B2
(45) Date of Patent: *Jun. 7, 2022

(54) ENLARGEABLE FLEXIBLE HOSE

(71) Applicant: FITT S.P.A., Sandrigo (IT)

(72) Inventors: Alessandro Mezzalira, Sandrigo (IT); Valentino Vigolo, Caldogno (IT); Luca Battaglia, Bassano del Grappa (IT); Andrea Petronilli, Carmignano di Brenta (IT); Marco Bucci, Baone (IT); Alessandro Cegalin, Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/151,145

(22) Filed: Jan. 16, 2021

(65) Prior Publication Data
US 2021/0140568 A1 May 13, 2021

Related U.S. Application Data

(63) Continuation of application No. 16/096,257, filed as application No. PCT/IB2016/052435 on Apr. 29, 2016, now Pat. No. 10,927,983.

(51) Int. Cl.
*F16L 11/12* (2006.01)
*F16L 11/08* (2006.01)

(52) U.S. Cl.
CPC ............ *F16L 11/12* (2013.01); *F16L 11/08* (2013.01)

(58) Field of Classification Search
CPC ................................. F16L 11/12; F16L 11/08
(Continued)

(56) References Cited

U.S. PATENT DOCUMENTS 3,028,290 A ‡ 4/1962 Roberts ............... B29D 23/18
264/50
3,682,202 A ‡ 8/1972 Buhrmann ............. D04B 1/14
138/12

(Continued)

FOREIGN PATENT DOCUMENTS

CN 2435609 ‡ 6/2001
CN 203628131 ‡ 6/2014
(Continued)

OTHER PUBLICATIONS

Elastollan Soft 35AP Data Sheet.‡
(Continued)

*Primary Examiner* — Craig M Schneider
*Assistant Examiner* — David R Deal
(74) *Attorney, Agent, or Firm* — Themis Law (57) ABSTRACT

A flexible hose for transporting a fluid, particularly a flexible garden hose for transporting water, includes an inner layer made of a first elastic polymeric material; an outer layer made of a second elastic polymeric material; and a textile reinforcement layer interposed therebetween. The inner and outer layers are reciprocally coupled to form a unitary tubular member, internally to which the textile reinforcement layer is embedded. The elasticity of the unitary tubular member causes it to automatically enlarge under the working pressure given by the liquid flowing therethrough to increase its original diameter and to automatically recover to assume again its original diameter once the working pressure stops. The textile reinforcement layer is susceptible to move from a rest configuration, when there is no working pressure, to a working configuration, when the unitary tubular member enlarges upon under the working pressure.

14 Claims, 4 Drawing Sheets

(58) Field of Classification Search
USPC .......................................................... 138/118
See application file for complete search history.

(56) References Cited

U.S. PATENT DOCUMENTS

| | | | | | |
|---|---|---|---|---|---|
| 3,934,064 | A | ‡ | 1/1976 | Lowthian | B29C 51/145 428/34.5 |
| 4,009,734 | A | ‡ | 3/1977 | Sullivan | B29C 53/12 138/12 |
| 4,989,643 | A | ‡ | 2/1991 | Walton | F16L 11/085 138/124 |
| 5,091,026 | A | ‡ | 2/1992 | Shizuo | B29C 53/785 138/14 |
| 5,477,888 | A | ‡ | 12/1995 | Mezzalira | D04B 1/225 138/125 |
| 5,816,622 | A | ‡ | 10/1998 | Carter | F16L 33/00 285/45 |
| 6,227,579 | B1 | ‡ | 5/2001 | Humphreys | F16L 27/08 285/23 |
| 6,561,550 | B1 | ‡ | 5/2003 | Kiraz | F16L 33/30 285/23 |
| 8,291,941 | B1 | ‡ | 10/2012 | Berardi | F16L 11/20 138/109 |
| 8,291,942 | B2 | ‡ | 10/2012 | Berardi | F16L 11/20 138/118 |
| 9,074,711 | B2 | ‡ | 7/2015 | Huang | F16L 11/10 |
| 10,927,983 | B2 | * | 2/2021 | Mezzalira | F16L 11/12 |
| 2001/0010339 | A1 | ‡ | 8/2001 | Thomas | F16L 11/12 239/19 |
| 2003/0098084 | A1 | ‡ | 5/2003 | Ragner | F16L 11/118 138/12 |
| 2009/0277525 | A1 | ‡ | 11/2009 | Jourdan | B32B 37/15 138/12 |
| 2011/0209791 | A1 | * | 9/2011 | Mezzalira | F16L 11/085 138/126 |
| 2012/0042980 | A1 | * | 2/2012 | Mezzalira | B32B 5/026 138/137 |
| 2012/0213958 | A1 | ‡ | 8/2012 | Golub | B32B 1/08 428/36 |
| 2012/0234425 | A1 | ‡ | 9/2012 | Berardi | F16L 11/10 138/13 |
| 2013/0087205 | A1 | ‡ | 4/2013 | Berardi | F16L 11/00 137/1 |
| 2013/0180615 | A1 | ‡ | 7/2013 | Ragner | F16L 11/112 138/11 |
| 2013/0213514 | A1 | ‡ | 8/2013 | Berardi | F16L 11/04 138/10 |
| 2014/0110013 | A1 | ‡ | 4/2014 | Mezzalira | D04B 1/225 138/124 |
| 2014/0130930 | A1 | ‡ | 5/2014 | Ragner | F16L 11/118 138/12 |
| 2015/0007902 | A1 | ‡ | 1/2015 | Ragner | F16L 11/118 138/12 |
| 2015/0041016 | A1 | ‡ | 2/2015 | Ragner | F16L 11/118 138/121 |
| 2015/0354731 | A1 | ‡ | 12/2015 | Ragner | B32B 25/10 138/11 |
| 2020/0147920 | A1 | * | 5/2020 | Cegalin | B32B 27/36 |

FOREIGN PATENT DOCUMENTS

| | | | |
|---|---|---|---|
| CN | 203868543 | ‡ | 10/2014 |
| CN | 104197141 | ‡ | 12/2014 |
| CN | 104405967 | ‡ | 3/2015 |
| CN | 204267921 | ‡ | 4/2015 |
| DE | 569929 | ‡ | 2/1933 |
| DE | 19524394 | ‡ | 1/1997 |
| DE | 202013101116 | ‡ | 5/2013 |
| DE | 202014004448 | ‡ | 7/2014 |
| DE | 202015100073 | ‡ | 3/2015 |
| EP | 0039744 | ‡ | 11/1981 |
| EP | 0118613 | ‡ | 9/1984 |
| EP | 0151017 | ‡ | 8/1985 |
| EP | 2233812 | ‡ | 3/2010 |
| EP | 2778491 | ‡ | 9/2014 |
| EP | 3286472 | ‡ | 4/2016 |
| EP | 3224518 | ‡ | 6/2016 |
| FR | 2468826 | ‡ | 5/1981 |
| FR | 2784447 | ‡ | 4/2000 |
| GB | 1326544 | ‡ | 8/1973 |
| JP | S5073919 U | ‡ | 6/1975 |
| JP | H03157599 A | ‡ | 11/1989 |
| JP | 2007071385 A | ‡ | 3/2007 |
| JP | 2015012881 | ‡ | 1/2015 |
| TW | M469409 | ‡ | 1/2014 |
| TW | M469410 | ‡ | 1/2014 |
| WO | WO-9117381 | ‡ | 11/1991 |
| WO | WO-9915326 | ‡ | 4/1999 |
| WO | WO-02084158 | ‡ | 4/2002 |
| WO | WO-2012014122 | ‡ | 2/2012 |
| WO | WO-2013155596 | ‡ | 4/2013 |
| WO | WO-2013066389 | ‡ | 5/2013 |
| WO | WO-2013105853 | ‡ | 7/2013 |
| WO | WO-2014121876 | ‡ | 12/2013 |
| WO | WO-2015023592 | ‡ | 2/2015 |
| WO | WO-2016098063 | ‡ | 6/2016 |
| WO | WO-2019098083 | ‡ | 6/2016 |

OTHER PUBLICATIONS

Inventors Digest vol. 37, Issue 01 (Jan. 2015).‡
Texin Rx T70A Data Sheet.‡
Niflex PP—Taro Plast S.p.A. Data Sheet Downloaded Nov. 12, 2018.‡

* cited by examiner
‡ imported from a related application

ENLARGEABLE FLEXIBLE HOSE

FIELD OF THE INVENTION

The present invention is generally applicable to the technical field of flexible hoses, and particularly relates to a flexible hose, preferably an irrigation hose or garden hose for transporting water, which is enlargeable, i. e. susceptible to automatically enlarge upon the passage of the fluid inside it and to automatically retract when the pressure of the liquid stops.

Definitions

As used herein, with the expression "textile reinforcement layer" or derivative thereof is meant a layer consisting of at least one textile yarn arranged on a layer that supports it. The "textile reinforcement layer" is disposed on the supporting layer so as to leave free portions thereof, generally square-, rectangular- or rhomboid-shaped.

As used herein, with the expression "textile yarn" or derivative thereof includes an elongated thread-like member of any shape and made of any material, provided that the magnitude of the length is significantly prevailing over the other. For example, the textile yarn may be a polymer yarn, which may have a unitary structure or may in turn consist of the union of several elementary threads, or a textile band having rectangular section.

As used herein, with the expression "textile knitted layer" or "knitting" or derivative thereof is meant a layer consisting of at least two yarns or groups of yarns laying on the supporting layer and connected to each other to form a plurality of chain-like stitches or knit.

As used herein, with the expression "textile woven layer" or "weaving" or derivative thereof is meant a layer consisting of at least two yarns or groups of yarns laying on a supporting layer with opposite inclinations and connected to one another alternately to form a weave. In a weaving a yarn is interlaced with another yarn once above and then below the latter. Depending on the inclination, the weaving is also known as fabric.

As used herein, with the expression "textile knotted layer" or "knotting" or derivative thereof is meant a layer consisting of at least two yarns or groups of yarns laying on the supporting layer with opposite inclinations and interconnected to each other by means of one or more knots. In a knotting a yarn cannot slide with respect to another due to the constraint imposed by the knots.

As used herein, with the expression "compatible materials" or derivative thereof materials are meant having chemical and/or physical compatibility to each other, that is materials which once coupled give rise to a junction adapted to support the transfer of tensile or shear stresses through the contact surface. Therefore, identical materials or in any case materials having the matrix with the same base have the maximum compatibility.

As used herein, with the expression "matrix" of a polymer or derivative thereof is meant a polymeric material capable of providing the molecular structure of the finished product.

As used herein, with the expression "providing" or derivative thereof is meant the preparation of an element of interest to a process step of interest, thus including any preventive treatment act for the optimum exploiting of the same step of interest, from the simple withdrawal and possible storage to pre-heat and/or chemical and/or physical treatments and the like.

As used herein, with the expression "film" or derivative thereof is meant a layer of polymeric material whose thickness is less than 0.5 mm.

STATE OF THE ART

Hoses are known, especially fire hoses, which includes an outer jacket and an inner flexible tube.

The outer jacket is generally made of synthetic textile fibers and has a predetermined inner diameter, whereas the inner tube is made of rubber and is designed to enlarges upon working pressure imparted by the water flowing therethrough up to an outer diameter coinciding with the inner diameter of the jacket.

As a result, the latter defines the inner diameter of the whole hose when in use. On the other hand, when not in use, i.e. when no water flows through the hose, the inner tube collapse and became flat, so that the whole hose has a relatively low bulkiness so that it can be stored on a reel.

This kind of hose is difficult and cumbersome to manufacture, since the jacket and the inner tube have to be manufactured separately and subsequently assembled.

Moreover, this kind of hoses are to be used by specialized operators, and is heavy, bulky and difficult to handle.

SUMMARY OF THE INVENTION

Object of the present invention is to overcome at least partially the above drawbacks, by providing an enlargeable flexible hose of remarkable efficiency and relative cheapness.

Another object of the invention is to provide an enlargeable flexible hose which can be manufactured in a simple and fast manner.

Another object of the invention is to provide an enlargeable flexible hose which can be manufactured automatically in line.

Another object of the invention is to provide an enlargeable flexible hose which is wieldy to use.

Another object of the invention is to provide an enlargeable flexible hose which has a relatively high burst pressure.

Another object of the invention is to provide an enlargeable flexible hose that has minimum bulkiness.

Another object of the invention is to provide an enlargeable flexible hose which is simple and practical to be stored.

Another object of the invention is to provide an enlargeable flexible hose that can be repaired in case of breakage.

Another object of the invention is to provide an enlargeable flexible hose that can be customized in length.

This and other objects are achieved by a flexible hose for transporting liquids, particularly an enlargeable irrigation hose or garden hose for the transport of water and by a hose assembly which includes such hose, according to which is herein described, shown and/or claimed.

The hose has a non-corrugated, non-coiled tubular structure, typical of the irrigation hoses or garden hoses. The polymeric layers may be tubular shaped.

An example of a corrugated hose is known from document U.S. Pat. No. 3,028,290, whereas an example of a coiled hose is known from document U.S. Pat. No. 4,009,734.

The flexible hose may comprise at least one inner layer of a first polymeric elastic material, at least an outer layer of a second polymeric elastic material and at least one textile reinforcement layer interposed therebetween.

The at least one inner layer and at least one outer layer may be joined together to form a unitary tubular member that integrates, that is embed, the at least one textile layer.

To do this, the at least one outer layer and the at least one inner layer may be reciprocally joined in correspondence of the areas of the outer surface of the at least one inner layer not covered by the at least one textile reinforcement layer. In other words, the at least one outer layer and the at least one inner layer may be reciprocally joined except at the regions occupied by the textile yarns of the at least one textile layer.

Suitably, the unitary tubular member may have an elasticity such as to automatically enlarge and possibly elongate under the pressure imparted by the working fluid that flows therethrough to increase its original diameter and possibly its original length and such as to retract automatically once the working pressure stops to return to the original diameter possibly to the original length.

The enlargement is apparent and appreciable at sight, whereas the elongation is less apparent and eventually not appreciable at sight. In other word, the elongation may occur or not, and in case of elongation is remarkably less apparent with respect to the enlargement.

To do this, the first and the second polymeric elastic material forming the unitary tubular member are to be suitably chosen.

The first and the second polymeric materials may be elastomers or thermoplastic elastomers (TPE).

Suitable TPEs may be TPE-S, such as PP/SEBS or PP/EPDM, or TPE-O, such as Ethylene-Octene copolymer.

Suitable elastomers may be natural rubber or latex.

Suitably, the unitary tubular member may have a Shore A hardness measured according to ASTM D2240 (3") of 30 ShA to 50 ShA.

The textile yarns of the at least one textile layer may be polyester, nylon 6,6, polyvinyl alcohol, para-aramid fibers, meta-aramid fibers, Rayon®.

Advantageously, the textile yarns of the at least one textile layer may have an elongation at break measured according to BISFA (Chap 7) less than 30%, and preferably less than 25%.

Advantageously, the textile yarns of the at least one textile layer may have a toughness as measured according to BISFA (Chap 7) of at least 50 cN/tex.

In a per se known manner, the automatic enlargement and possibly elongation is promoted by one or more restrictions or flow restrictors inserted in the hose or connected therewith, as taught by the documents EP2520840 and/or EP2778491, which are referred to for proper consultation. Suitably, one of the ends of the hose may be connected to means for supplying the liquid to be transported, for example a faucet.

As known, a textile reinforcement layer in a flexible hose if stressed tends to elongate axially and/or to enlarge radially, depending on the type.

Suitably, the unitary tubular member and the at least one textile reinforcement layer may cooperate each other so that under a working pressure of 2 bar the hose enlarges its outer diameter of at least 1.3 times with respect to its original outer diameter, preferably of at least 1.4 times with respect to its original diameter, more preferably at least 1.45 times with respect to its original diameter and still more preferably at least 1.5 times with respect to its original diameter.

On the other hand, the unitary tubular member and said at least one textile reinforcement layer may cooperate each other so that under a working pressure of 5 bar the elongation in length of said unitary tubular member is less than 20% with respect to the original length when in the unitary tubular member does not flow the liquid, and preferably less than 15% with respect to the original length when in the unitary tubular member does not flow the liquid.

Advantageously, the at least one textile reinforcement layer of the enlargeable hose of the present invention may be susceptible to move between a rest configuration that has at rest, i.e. when the liquid does not flow through the unitary tubular member, and a working configuration that has when the unitary tubular member is actuated by the working pressure of the liquid flowing therethrough.

In the working configuration the at least one textile reinforcement layer expands radially and possibly extends axially to accompany the enlargement and possibly the elongation of the unitary tubular member.

Depending on whether the yarns of the textile reinforcement layer are elastic or rigid and on the type of the textile reinforcement layer, such enlargement and possible elongation is more or less apparent.

However, the yarns of the textile reinforcement layer may preferably be rigid, so as to effectively act on the unitary tubular member upon the enlargement thereof.

Preferably, the at least one textile reinforcement layer and the unitary tubular member may be mutually configured so that the former intercepts the latter upon its enlargement and possible elongation in order to determine the maximum diameter and possibly the maximum length.

In other words, for a given inner hose pressure the maximum radial enlargement and possibly the maximum axial elongation of the at least one textile reinforcement layer is lower than the maximum radial enlargement and possibly the maximum axial elongation of the unitary tubular member, so that the maximum radial enlargement and possibly the maximum axial elongation of the at least one textile reinforcement layer determines the maximum radial enlargement and possibly the maximum axial elongation of the whole hose.

Suitably, the automatic retraction of the unitary tubular member allows the at least one textile reinforcement layer to return to the rest configuration once the pressure inside the hose stops.

This automatic retraction of the unitary tubular member can only be accomplished by its elasticity, without any other help. In particular, the hose of the invention may be free of coil springs or similar automatic retraction means.

Thanks to one or more of the above features, it is possible to obtain a flexible enlargeable hose wieldy and practical to use.

The flexible hose according to the present invention allows to combine all the advantages of an enlargeable hose with those of a "classic" flexible hose, without all the drawbacks of the enlargeable hoses of the prior art.

In fact, the flexible hose according to the present invention has a relatively high burst pressure, absolutely comparable to that of the "classical" flexible hoses.

In fact, the at least one textile reinforcement layer ensures high burst pressure, and therefore greater durability of the hose.

Moreover, thanks to the fact that the at least one outer layer is of polymeric material, the flexible hose is simple and quick to clean from any residual dirt and/or mud due to dragging on wet soils.

Further, the overall bulkiness of the flexible hose according to the present invention is minimal. This allows for example to store it in a very small space. It is moreover easily storable on a classic hose reel.

In addition, the flexible hose according to the present invention in case of breakage or damage can be restored as a "classic" hose. It is also possible to replace the original fittings, if any, using the classic fittings for flexible hoses on the market, for example in case to rupture of one thereof.

It is however understood that in the hose of the present invention fittings or any element for connecting the ends are not needed to connect each other the various layers. In fact, in the hose of the present invention all the elements are integrated, and in particular the at least one textile reinforcement layer is integrated trough the unitary tubular member.

It is further possible to cut the hose of the present invention to any size while maintaining the features of the whole structure. This makes further possible the customized per meter commercialization thereof.

Preferably, the reinforcing textile layer of the enlargeable hose according to the present invention may be a textile knotted layer or a textile knitted layer. Preferably, the stitches of the latter may be a of the tricot-type, radial-type or diamond-type, or may be interlocked or interweaved.

The at least one first textile layer and the unitary tubular member may be mutually configured so that the former intercepts the latter upon its enlargement in order to determine the maximum diameter.

Advantageous embodiments of the invention are described in the dependent claims.

BRIEF DESCRIPTION OF THE DRAWINGS

Further features and advantages of the invention will be apparent upon reading the detailed description of a preferred, non-exclusive embodiment of an enlargeable flexible hose 1, which are described as non-limiting examples with the help of the annexed drawings, in which.

DETAILED DESCRIPTION OF SOME PREFERRED EMBODIMENTS

With reference to the above figures, the enlargeable hose 1 is advantageously used for the transport of liquids. In particular, the flexible hose 1 may be a irrigation hose or garden hose for the transport of water.

Figure 3:
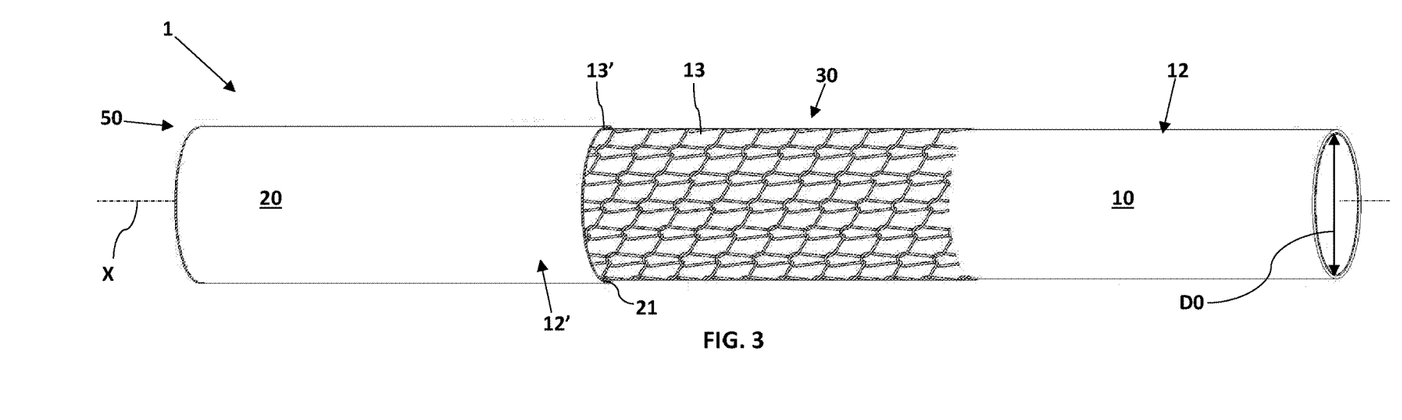
FIG. 3 is a schematic side view of an embodiment of the hose 1 at rest.
Figure 4:
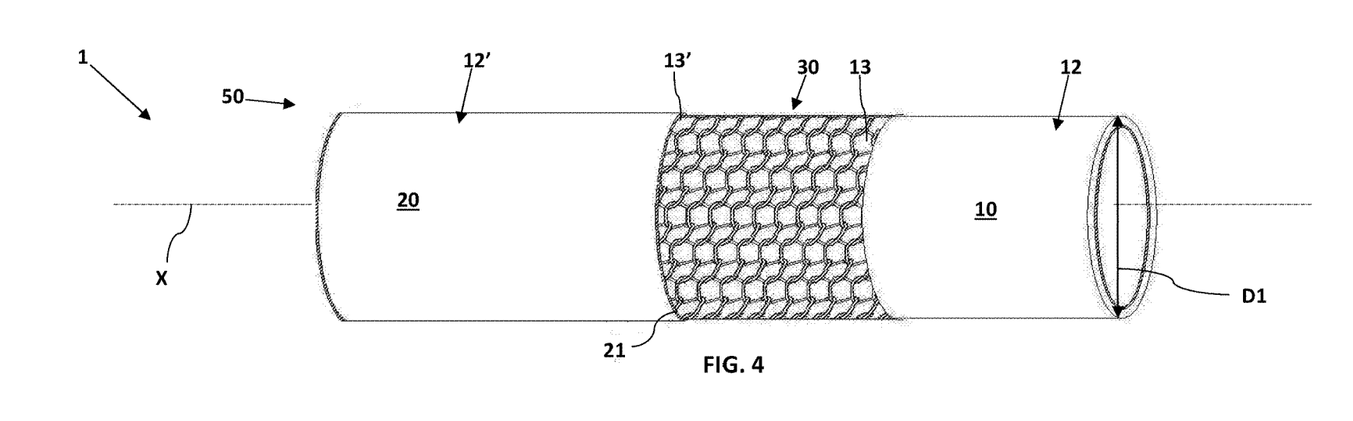
FIG. 4 is a schematic side view of the embodiment of the hose 1 of FIG. 4 under pressure.

As particularly shown in FIGS. 3 and 4, the enlargeable hose 1 may include an inner polymer layer 10 and an outer polymer layer 20.

The enlargeable flexible hose 1 may further include a knitted textile layer 30 with a tricot-type chain stitches.

It is understood that although in the following there is described a flexible hose 1 with the above structure, the hose according to the invention may include other layers, according to what is defined by the appended claims.

For example, a double textile reinforcement layer may be provided, or one or more further polymeric layers internally or externally to the above layers.

It is further understood that although in the following a flexible hose 1 with the above structure is described, the technical features here described are applicable to a hose which includes at least three layers, according to what is defined by the appended claims.

It is further understood that although hereinafter reference is made to a garden hose for the transport of water, the enlargeable flexible hose 1 can have any application and can transport any liquid, according to what is defined by the appended claims.

In a preferred but not exclusive embodiment, inner layer 10 and outer layer 20 may be made of a styrene-based thermoplastic elastomer (TPE-S) having a matrix based on polypropylene (PP), for example the Nilflex® SH (Taro Plast SpA), having a Shore A hardness measured according to ASTM D2240 (3") of 40. Such a material has a tensile strength measured according to ASTM D412/C of about 6.5 MPa and an elongation at break measured according to ASTM D412/C of approximately 880%.

Indicatively, the inner layer 10 may have a thickness of 1.5 mm to 2.5 mm, preferably 1.6 mm-2 mm.

In a preferred but not exclusive embodiment, the textile reinforcement layer 30 may be made of polyester (PET)-based yarns, for example the Brilen GLE® (Brilen Tech SA) having a linear density of 550 dtex. Such yarns have an ultimate tensile strength, measured according to BISFA (Chap 7) of 42.7+/−4.2 N, an elongation at break measured according to BISFA (Chap 7) of 12.5+/−2.5% and toughness measured according BISFA (Chap 7) of 75.5+/−7 cN/tex.

The first textile reinforcement layer 30 may be placed on the outer surface 12 of the inner layer 10 so as to leave thereon a plurality of open areas 13, which are directly facing to the corresponding portions 13' of the inner surface 21 of the outer layer 20.

Suitably, the inner layer 10 and the outer layer 20 may be reciprocally bonded in correspondence with the respective uncovered areas 13, 13'.

The bond between the inner layer 10 and the outer layer 20 may be assured by the use of materials compatible with each other or by a layer of adhesive material interposed between them.

To effect such a coupling, the inner layer 10 and the outer layer 20 form a unitary tubular member 50, inside of which the reinforcing textile layer 30 may be integrated or embedded.

The possible choice of the same material for all the polymeric layers of the hose makes homogeneous the mechanical behavior of the unitary tubular member 50, and ensures maximum compatibility between the materials.

Figure 1:
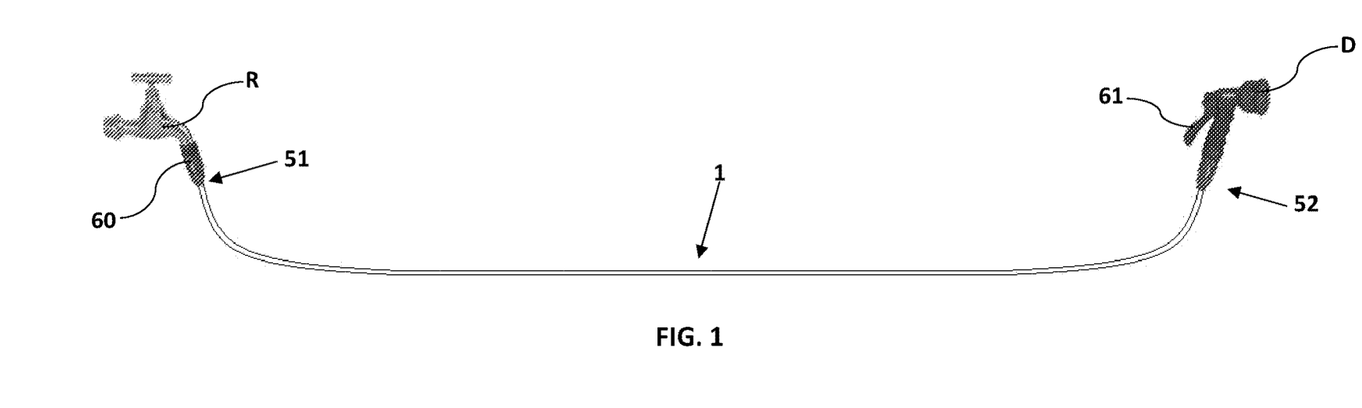
FIGS. 1 and 2 are schematic view of an embodiment of the hose 1 during use.
Figure 2:
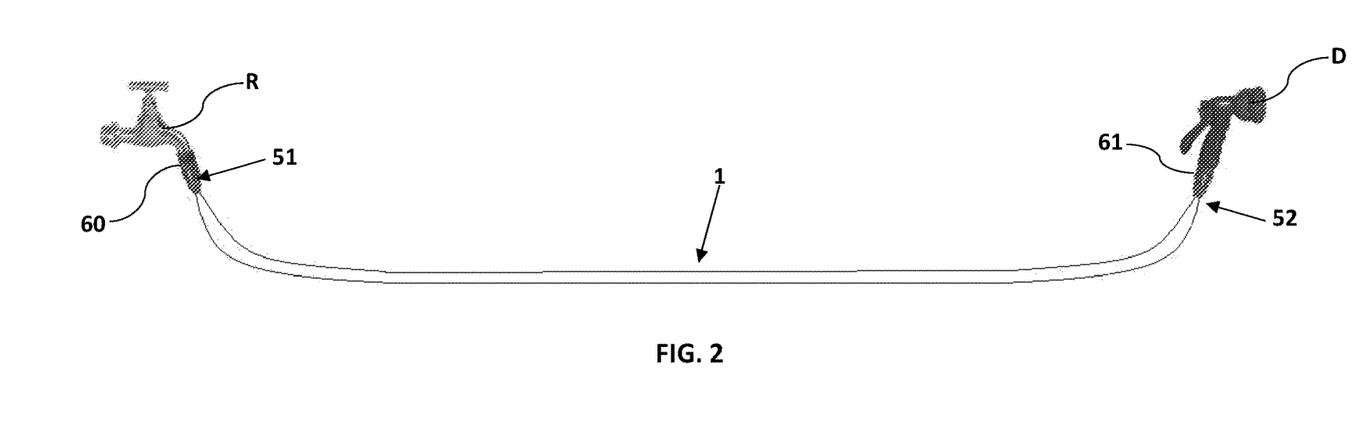

As particularly shown in FIGS. 1 and 2, at the ends 51, 52 of the hose 1 appropriate mutual union elements may be provided.

For example, respective couplers 60, 61 may be provided.

In a preferred but not exclusive embodiment, the coupler 60 may be e.g. a female coupler, and may be adapted to connect the hose 1 to a point of use, for example a tap R. On the other hand, the coupler 61 may be a male coupler, and may be adapted to connect the hose 1 to one or more sprinkler accessories D, for example a nozzle or a sprinkler.

In another embodiment, the end 52 of the hose 1 may be fixedly coupled to the sprinkler accessory D, for example a nozzle or a sprinkler. In this case, the hose 1 does not include the coupler 61, and cannot be coupled to more sprinkler accessories. At the other end 51 the coupler 60 may be provided for connecting the hose 1 to a point of use, for example a bib R.

Thanks to the above features, the enlargeable hose 1 may be susceptible to be automatically enlarged and possible elongated by the working pressure imparted by the water that flows internally it, thus increasing its original diameter and possibly its original length.

To do this, in a per se known manner, at least one restriction inside the hose or connected therewith may be provided.

In a preferred but not exclusive embodiment, in per se known manner, the at least one restriction may be defined by a flow restrictor located inside the coupler 61.

On the other hand, the hose 1 may internally include one or more restrictions, such as thickened portions or the like.

The at least one restriction may also be provided in the sprinkler accessory D, for example a nozzle or a sprinkler.

The at least one restriction may create a pressure drop such that the pressure upstream thereof acts internally to the hose 1, thus radially enlarging it perpendicularly to the axis X and possibly axially elongating it along the same axis X.

In practice, once connected to the hose 1 to a point of use, for example to a tap R, upon the opening of the tap the water that passes through the hose 1 promotes the radial enlarging and possibly the axial elongation thereof, as shown in FIGS. 1 and 2. In any event, the elongation will be very low, and sensibly lower than the enlargement.

In other words, the water flow promotes the passage of the hose 1 from an original diameter D0 (FIG. 3), that the same hose 1 has when no water passes through it, to a working diameter D1 (FIG. 4).

The transition from the original diameter D0 to the working diameter D1 may occur gradually.

By contrast, upon the closing of the tap R the hose 1 automatically retracts, thus recovering to its original diameter and possibly to the original length.

In order to achieve the above, the unitary tubular member 50 and the textile layer 30 can cooperate with each other.

More precisely, the unitary tubular member 50 may have an elasticity such as to automatically radially enlarge under the working pressure imparted by the water and such as to retract automatically once the working pressure stops.

On the other hand, the enlargement of the unitary tubular member 50 promotes the passage of the textile reinforcement layer 30 from a rest configuration, shown in FIG. 3, which it has when no water flows through the hose, to a working configuration, shown in FIG. 4, which it has under the working pressure.

Conversely, when the working pressure stops the automatic retraction of the unitary tubular member 50 returns the textile reinforcement layer 30 in its rest configuration.

Under the working pressure, in addition to the increase in the diameter and possibly in the length of the hose, a thinning of the whole thickness thereof further occurs. With the configuration and the materials shown above, the wall thickness under pressure decreases by about half.

Suitably, the textile reinforcement layer 30 may be configured so as to intercept the unitary tubular member 50 upon its enlargement so as to determine the maximum diameter.

To do this, the yarn of the textile reinforcement layer 30 and the materials of the unitary tubular member 50 may be suitably selected, for example as described above.

The knitted textile reinforcement layer 30 may be of the chain-like tricot type, as shown in the FIGS. 3 and 4, or made according to the teachings of EP0623776 in the name of the same Applicant.

Figure 5:
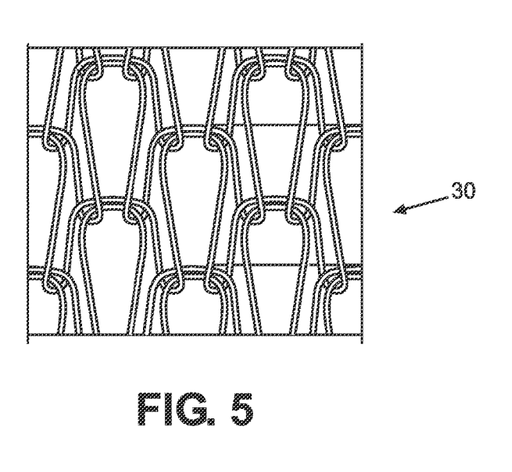
FIG. 5 shows an example of a knitted textile reinforcement layer of the diamond-stitches type.

Alternatively, the knitted textile reinforcement layer 30 may be of the diamond-stitches type, as shown in FIG. 5, or of the radial type, as taught by the European Patent application EP0527512 in the name of the same Applicant.

Figure 6:
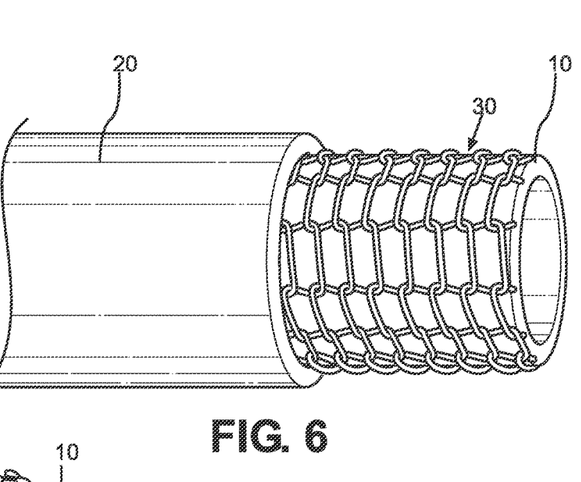
FIG. 6 shows an example of hose 1 including a knitted textile reinforcement layer of the interlocked type.
Figure 7:
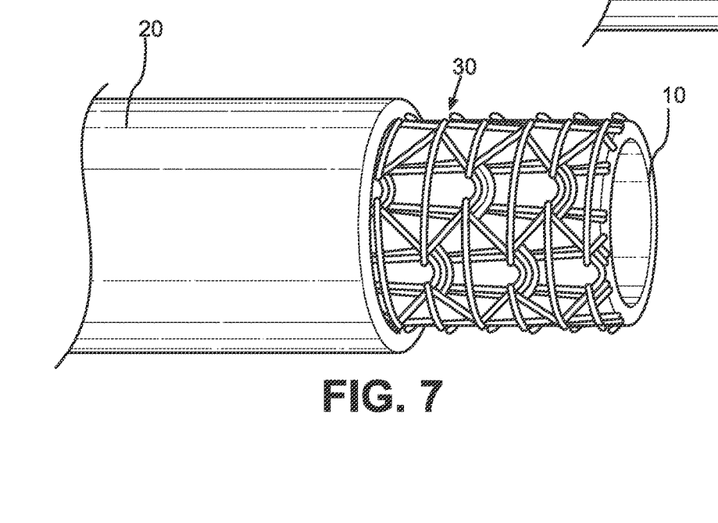
FIG. 7 shows an example of hose 1 including a knitted textile reinforcement layer of the interweaved type.

In another embodiment, the knitted textile reinforcement layer 30 may be of the interlocked type, as shown in FIG. 6, or of the interweaved type, as shown in FIG. 7.

Figure 8:
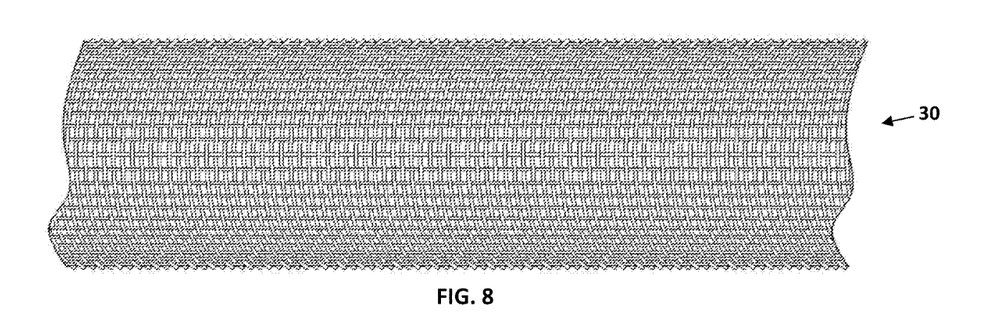
FIGS. 8 and 9 show two examples of woven textile reinforcement layer.
Figure 9:
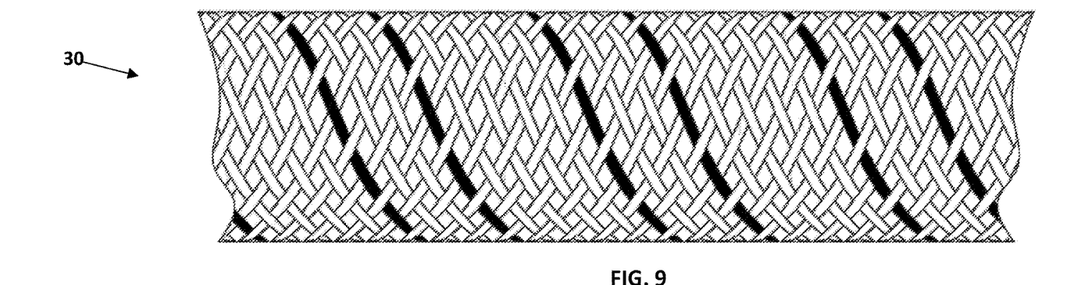
Figure 10:
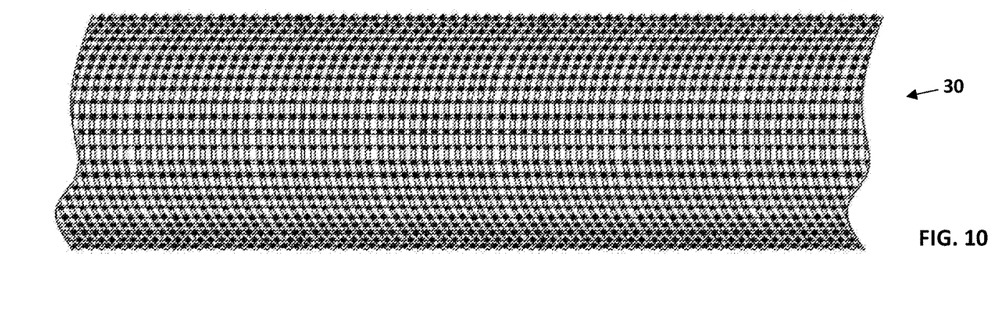
FIG. 10 shows an example of a knotted textile reinforcement layer.

Alternatively to the knitted configuration, the first textile reinforcement layer 30 may be a weaving or knotting. FIGS. 8 and 9 show two examples of textile reinforcement woven layer, different each other for the orientation, the number and configuration of the yarns. FIG. 10 shows an example of a textile reinforcement knotted layer.

Suitably, the unitary tubular member and the at least one textile reinforcement layer may cooperate with each other so that under a working pressure of 2 bar the hose enlarges its outer diameter of at least 1.3 times with respect to its original outer diameter, preferably of at least 1.4 times with respect to its original diameter, more preferably at least 1.45 times with respect to its original diameter and still more preferably at least 1.5 times with respect to its original diameter.

For example, with a hose having the structure described above and manufactured in the above materials, with an inner diameter at rest of 9 mm, outer diameter at rest of 14.5 mm and weight of 80 g/mt, the enlargements at different Internal working pressures are provided in table 1 below.

TABLE 1

| Working pressure (bar) | Outer diameter [mm] | Øout under pressure/ Øout at rest |
| --- | --- | --- |
| 0 | 14.5 | 1 |
| 0.5 | 20.5 | 1.41 |
| 1 | 23.1 | 1.59 |
| 1.5 | 23.3 | 1.61 |
| 2 | 23.5 | 1.62 |
| 2.5 | 23.8 | 1.64 |
| 3 | 24.1 | 1.66 |
| 3.5 | 24.4 | 1.68 |
| 4 | 24.7 | 1.70 |
| 4.5 | 25 | 1.72 |
| 5 | 25.3 | 1.74 |
| 5.5 | 25.4 | 1.75 |
| 6 | 25.5 | 1.76 |

It is understood that these data may change depending on the materials and/or the features of the hose, such as the inner or outer diameter or the weight/mt thereof.

Suitably, the unitary tubular member 50 and the textile reinforcement layer 30 may cooperate each other so that under a working pressure of 5 bar the elongation in length of said unitary tubular member 50 is less than 20% with respect to the original length, and preferably less than 15% with respect to the original length.

This film 20 has the purpose of protecting the underlying layers, in particular the textile layers, and to give the appearance to the hose. It is also important for the resistance to external agents and the sliding of the hose on the ground. In fact, it minimizes fouling of the hose as a result of the use on muddy grounds or in a garden.

From the above description, it is apparent that the invention fulfils the intended objects.

The invention is susceptible of numerous modifications and variations, all falling within the inventive concept expressed in the attached claims. All the details may be replaced with other technically equivalent elements, and the materials may be different according to requirements, without departing from the scope of the invention.

Although the invention has been described with particular reference to the attached figures, reference numbers used in the description and in the claims are used to improve the intelligence of the invention and do not constitute any limitation of the claimed scope.

The invention claimed is:

1. A hose assembly for transporting liquids, comprising:
an enlargeable flexible hose; and
a restriction placed within the hose to create a working pressure therein to promote an enlargement of the flexible hose,
wherein the flexible hose includes:
an inner layer made of a first elastic polymeric material;
an outer layer made of a second elastic polymeric material; and
a textile reinforcement layer made of a single mesh interposed between the inner layer and the outer layer,
wherein the inner layer and the outer layer are reciprocally coupled to form a unitary tubular member having an original outer diameter;
wherein the unitary tubular member has an elasticity that causes the unitary tubular member to automatically enlarge under the working pressure imparted by a liquid flowing therethrough without increasing in length more than 15%, so as to increase the original outer diameter of the unitary tubular member and have an automatic recovery once the working pressure stops and assume again the original outer diameter;
wherein the textile reinforcement layer is embedded within the unitary tubular member to move between a rest configuration that the textile reinforcement layer has when no liquid flows through the unitary tubular member, and a working configuration that the textile reinforcement layer has when the unitary tubular member enlarges upon the working pressure; and
wherein the textile reinforcement layer consists of non-elastic yarns having an elongation at break measured according to BISFA (Chap 7) of less than 30%.

2. The hose assembly according to claim 1, wherein the textile reinforcement layer is embedded within the unitary tubular member so that an automatic enlargement of the unitary tubular member promotes a moving of the textile reinforcement layer from the rest configuration to the working configuration, the automatic recovery of the unitary tubular member promoting a return of the textile reinforcement layer from the working configuration to the rest configuration.

3. The hose assembly according to claim 1, wherein the textile reinforcement layer and the unitary tubular member are reciprocally disposed so that the textile reinforcement layer captures the unitary tubular member upon its enlargement so as to define a maximum outer diameter thereof.

4. The hose assembly according to claim 1, wherein the textile reinforcement layer lays on an outer surface of the inner layer so as to leave thereon a plurality of uncovered areas, the outer layer and the inner layer being reciprocally coupled at the uncovered areas.

5. The hose assembly according to claim 1, wherein the unitary tubular member has the original outer diameter when the textile reinforcement layer is in the rest configuration, the unitary tubular member being enlarged when the textile reinforcement layer is in the working configuration.

6. The hose assembly according to claim 1, wherein the textile reinforcement layer is selected among the group consisting of knitting, weaving, or knotting.

7. The hose assembly according to claim 6, wherein the textile reinforcement layer is a knitted layer of a chain-shaped tricot type, of a diamond-stitches type, of a radial type, of an interlocked type, or of an interweaved type.

8. The hose assembly according to claim 1, wherein the unitary tubular member once enlarged by the working pressure recovers back to the original outer diameter exclusively because of its elasticity.

9. The hose assembly according to claim 1, wherein the flexible hose is a garden hose for transport of water.

10. The hose assembly according to claim 1, wherein the non-elastic yarns have a toughness measured according to BISFA (Chap 7) of at least 50 cN/tex.

11. A hose assembly for transporting liquids, comprising:
an enlargeable flexible hose; and
a restriction placed within the hose or connected to the hose to create a working pressure therein to promote an enlargement of the flexible hose,
wherein the flexible hose includes:
an inner layer made of a first elastic polymeric material;
an outer layer made of a second elastic polymeric material; and
a textile reinforcement layer made of a single mesh interposed between the inner layer and the outer layer,
wherein the inner layer and the outer layer are reciprocally coupled to form a unitary tubular member having an original outer diameter;
wherein the unitary tubular member has an elasticity that causes the unitary tubular member to automatically enlarge under the working pressure imparted by a liquid flowing therethrough without increasing in length more than 15%, so as to increase the original outer diameter of the unitary tubular member and have an automatic recovery once the working pressure stops and assume again the original outer diameter;
wherein the textile reinforcement layer is embedded within the unitary tubular member to move between a rest configuration that the textile reinforcement layer has when no liquid flows through the unitary tubular member, and a working configuration that the textile reinforcement layer has when the unitary tubular member enlarges upon the working pressure; and
wherein the unitary tubular member and the textile reinforcement layer cooperate with each other so that under a working pressure of 5 bar an elongation in length of the unitary tubular member is less than 20% with respect to an original length when no liquid flows in the unitary tubular member.

12. The hose assembly according to claim 11, wherein the textile reinforcement layer consists of non-elastic rigid yarns having an elongation at break measured according to BISFA (Chap 7) of less than 30%.

13. The hose assembly according to claim 1, wherein the unitary tubular member has an inner diameter of 9 mm at rest, an outer diameter of 14.5 mm at rest and a weight of 80 g/m, and experiences an increase in the outer diameter of more than 50% under an internal pressure of 2 bars.

14. The hose assembly according to claim 11, wherein the unitary tubular member has an inner diameter of 9 mm at rest, an outer diameter of 14.5 mm at rest and a weight of 80 g/m, and experiences an increase in the outer diameter of more than 50% under an internal pressure of 2 bars.

* * * * *